(12) United States Patent
Luo

(10) Patent No.: US 11,342,848 B2
(45) Date of Patent: May 24, 2022

(54) MULTIPHASE SWITCHING CONVERTERS WITH DAISY CHAIN CONFIGURATION AND ASSOCIATED PHASE SHEDDING CONTROL METHOD

(71) Applicant: Chengdu Monolithic Power Systems Co., Ltd., Chengdu (CN)

(72) Inventor: Suhua Luo, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 17/184,052

(22) Filed: Feb. 24, 2021

(65) Prior Publication Data
US 2021/0288579 A1 Sep. 16, 2021

(30) Foreign Application Priority Data
Mar. 16, 2020 (CN) .......................... 202010181832.3

(51) Int. Cl.
*H02M 3/158* (2006.01)
*H02M 1/084* (2006.01)
*H02M 1/00* (2006.01)

(52) U.S. Cl.
CPC ....... *H02M 3/1584* (2013.01); *H02M 1/0845* (2013.01); *H02M 1/0009* (2021.05); *H02M 3/1586* (2021.05)

(58) Field of Classification Search
CPC ............. H02M 1/0009; H02M 1/0845; H02M 3/1584; H02M 3/1586
See application file for complete search history.

(56) References Cited

U.S. PATENT DOCUMENTS

| 8,493,044 B2* | 7/2013 | Xu ...................... H02M 3/1584 323/282 |
| 9,912,240 B1 | 3/2018 | James |
| 2005/0083024 A1* | 4/2005 | Harris ................. H02M 3/1584 323/282 |
| 2016/0315538 A1* | 10/2016 | Nguyen .............. H02M 3/1584 |
| 2021/0028683 A1 | 1/2021 | Lijie |
| 2021/0028686 A1 | 1/2021 | Lijie |
| 2021/0028704 A1 | 1/2021 | Lijie |

OTHER PUBLICATIONS

U.S. Appl. No. 17/037,388, filed Sep. 29, 2020, Bo.

\* cited by examiner

*Primary Examiner* — Kyle J Moody
*Assistant Examiner* — Lakaisha Jackson
(74) *Attorney, Agent, or Firm* — Perkins Coie LLP

(57) ABSTRACT

A multiphase switching converter has a plurality of switching circuits coupled in parallel, and a plurality of control circuits configured in a daisy chain. Each control circuit receives a phase input signal, and provides a phase output signal and a switching control signal for controlling a corresponding switching circuit. When a current sense signal is less than a phase shedding threshold, and if a corresponding one of the control circuits is a last one in the daisy chain or if a pulse on the phase input signal lasts within a preset time period, then a corresponding one of the switching circuits stops a power output, and the phase output signal equals the phase input signal.

19 Claims, 13 Drawing Sheets

S210: In an initialization stage, the master control circuit 101 provides the switching control signal PWM1 to control the switching circuit 111 according to the turn-on control signal Set, and provides the phase output signal DOUT1 at the high voltage level state. If a combination of the phase output signal DOUT1 and the switching control signal PWM1 meets a phase transfer type, then the initialization stage is finished, the phase output signal DOUT1 equals the turn-on control signal Set. And when the phase input signal DIN1 transits to the low voltage level state, a control cycle of the control circuits 101~10N of the daisy chain architecture is finished, and the master control circuit 101 enters the initialization stage again.

S220: when the phase input signal DINx is at the high impedance state, the slave control circuit 10x enters the initialization stage to initialize the phase output signal DOUTx at the high impedance state. When a first pulse appears on the phase input signal DINx after the phase input signal DINx exits the high impedance state, the switching circuit 11x is turned on by the switching control signal PWMx. And when the combination of the phase output signal DOUTx and the switching control signal PWMx meets the phase transfer type, the initialization stage is finished, and the phase output signal DOUTx equals the phase input signal DINx.

FIG. 2

MULTIPHASE SWITCHING CONVERTERS WITH DAISY CHAIN CONFIGURATION AND ASSOCIATED PHASE SHEDDING CONTROL METHOD

CROSS-REFERENCE TO RELATED APPLICATIONS

This application claims the benefit of CN application 202010181832.3, filed on Mar. 16, 2020, and incorporated herein by reference.

TECHNICAL FIELD

The present invention generally relates to electronic circuits, and more particularly but not exclusively, to multiphase switching converters.

BACKGROUND

In recent years, with the development of high performance CPUs (central processing units), switching converters with lower output voltage and higher output current are needed. Multiphase switching converters having a plurality of switching circuits with outstanding performance in thermal, EMI and load transient response are widely used in power solutions for CPUs.

The number of phases in the multiphase switching converter is determined by the load, and needs to be increased when current required by the load increases. For multiphase switching converters with single controller, this means logic, circuit, structure and size of the controller all need to be adjusted, which undoubtedly increases the burden of system development and overall cost.

For this reason, daisy chain architecture with good scalability is introduced into the multiphase switching converter, in which there are several control circuits, each control circuit is used to drive a corresponding switching circuit. In this architecture, the total number of the switching circuits can be easily adjusted according to different applications. If the number of the switching circuits needs to be increased, only a new control circuit and corresponding external components are needed.

SUMMARY

Embodiments of the present invention are directed to a multiphase switching converter comprising: a plurality of switching circuits coupled in parallel between an input voltage and an output voltage; and a plurality of control circuits configured in a daisy chain, wherein each of the plurality of control circuits has a phase control input terminal and a phase control output terminal, and each of the plurality of control circuits is respectively coupled to a corresponding one of the plurality of switching circuits to provide a switching control signal, wherein the phase control input terminal of each of the plurality of control circuits is coupled to the phase control output terminal of a previous one of the plurality of control circuits in the daisy chain to receive a phase input signal, and the phase control output terminal of each of the plurality of control circuits is coupled to the phase control input terminal of a latter one of the plurality of control circuits in the daisy chain to provide a phase output signal, and wherein one of the plurality of control circuits is configured as a master control circuit, and each of the rest of the plurality of control circuits is respectively configured as a slave control circuit; wherein when a current sense signal representative of a current flowing through the corresponding one of the plurality of switching circuits is less than a phase shedding threshold, and if a phase shedding condition is satisfied, then a corresponding one of the plurality of control circuits is configured to stop a power output of the one of the plurality of switching circuits, and the phase output signal equals the phase input signal; and wherein after the phase input signal exits a high impedance state, if a pulse appears on the phase input signal within a first preset time period, then the corresponding one of the plurality of control circuits is configured to resume the power output of the corresponding one of the plurality of switching circuits, and the phase output signal transits to the high impedance state.

Embodiments of the present invention are also directed to a phase shedding control method for a multiphase switching converter, wherein the multiphase switching converter comprises a plurality of switching circuits coupled in parallel, and a plurality of control circuits configured in a daisy chain, each of the plurality of control circuits has a phase control input terminal and a phase control output terminal, and each of the plurality of control circuits is respectively coupled to a corresponding one of the plurality of switching circuits to provide a switching control signal, and wherein the phase control input terminal of each of the plurality of control circuits is coupled to a previous one of the plurality of control circuits in the daisy chain to receive a phase input signal, and the phase control output terminal of each of the plurality of control circuits is coupled to a latter one of the plurality of control circuits in the daisy chain to provide a phase output signal, the phase shedding control method comprising: sensing a current flowing through the corresponding one of the plurality of switching circuits, and providing a current sense signal accordingly; comparing the current sense signal with a phase shedding threshold; when the current sense signal is less than the phase shedding threshold, and when a phase shedding condition is satisfied, a corresponding one of the plurality of control circuits is configured to stop a power output of the corresponding one of the plurality of switching circuits, the phase output signal equals the phase input signal; and after the phase input signal exits a high impedance state, if a pulse appears on the phase input signal within a first preset time period, then the corresponding one of the plurality of control circuits is configured to resume the power output of the corresponding one of the plurality of switching circuits, and the phase output signal transits to the high impedance state.

Embodiments of the present invention are further directed to a control circuit used in a multiphase switching converter, wherein the multiphase switching converter comprises a plurality of switching circuits coupled in parallel and a plurality of control circuits configured in a daisy chain, the control circuit comprising: a phase control input terminal configured to receive a phase input signal from a previous one of the plurality of control circuits in the daisy chain; and a phase control output terminal configured to provide a phase output signal to a latter one of the plurality of control circuits in the daisy chain; wherein when a current sense signal representative of a current flowing through a corresponding one of the plurality of switching circuits is less than a phase shedding threshold, and if the corresponding one of the plurality of control circuits is a last one in the daisy chain or if a pulse on the phase input signal lasts within a first preset time period, then a corresponding one of the plurality of control circuits is configured to stop a power output of the one of the plurality of switching circuits, and the phase output signal equals the phase input signal.

These and other features of the present invention will be readily apparent to persons of ordinary skill in the art upon reading the entirety of this disclosure, which includes the accompanying drawings and claims.

BRIEF DESCRIPTION OF THE DRAWING

The present invention can be further understood with reference to the following detailed description and the appended drawings, wherein like elements are provided with like reference numerals.

FIG. 2 shows a working flowchart 201 of the multiphase switching converter 100 in accordance with an embodiment of the present invention;

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element. When a signal is described as "equal to" another signal, it is substantially identical to the other signal.

Multiphase Switching Converter and Associated Phase Interleaving

Figure 1:
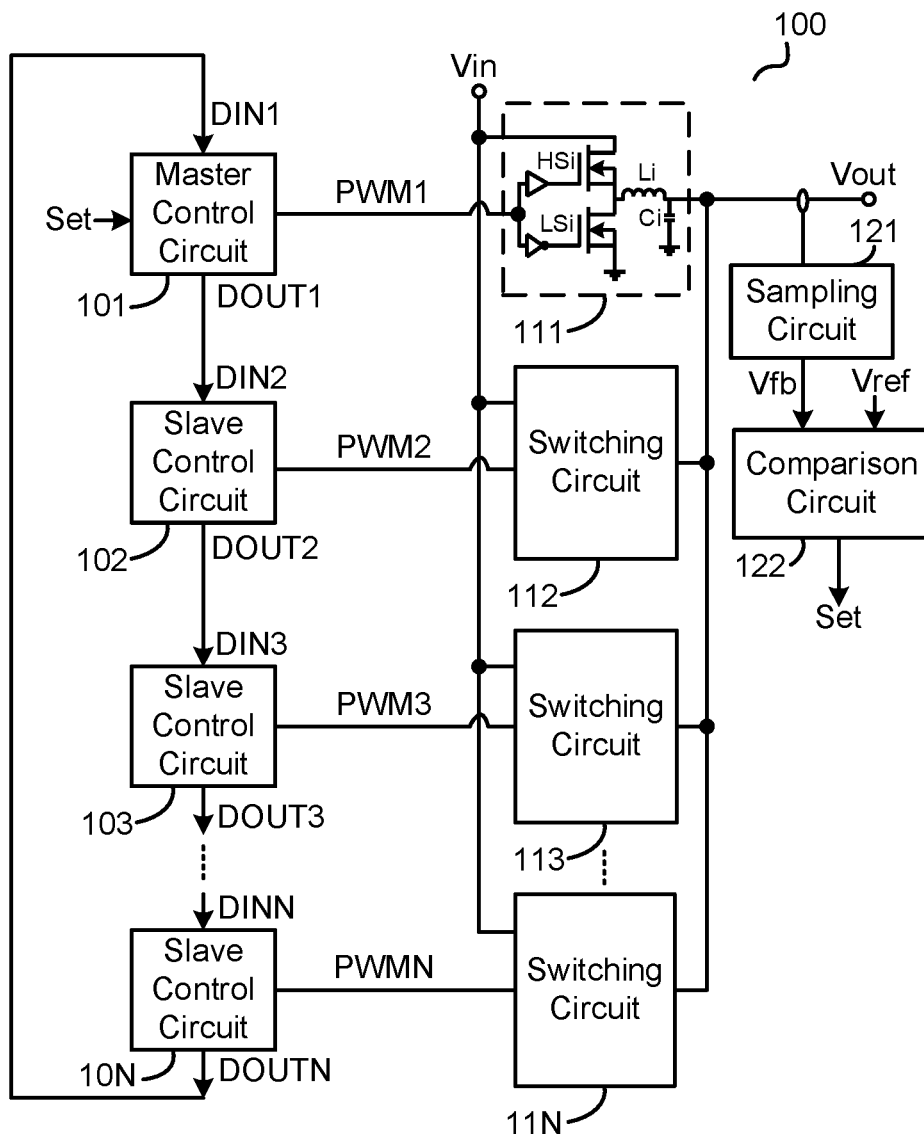
FIG. 1 illustrates a block diagram of a multiphase switching converter 100 in accordance with an embodiment of the present invention.

FIG. 1 illustrates a block diagram of a multiphase switching converter 100 in accordance with an embodiment of the present invention. The multiphase switching converter 100 comprises switching circuits 111-11N coupled in parallel between an input voltage Vin and an output voltage Vout, and control circuits 101-10N configured in a daisy chain architecture, where N is an integer larger than 1. A switching circuit 11i (i=1, 2, ... N) comprises an input terminal configured to receive the input voltage Vin and an output terminal configured to provide the output voltage Vout to a load. Each of the control circuits 101-10N is coupled to one of the switching circuits 111-11N to provide a switching control signal PWM. A control circuit 10i (i=1, 2, ... N) comprises a phase control input terminal, and a phase control output terminal, the phase control input terminal of the control circuit 10i is coupled to a phase control output terminal of a previous control circuit in the daisy chain, e.g., 10(i−1) to receive a phase input signal DINi, and the phase control output terminal of the control circuit 10i is coupled to a phase control input terminal of a latter control circuit in the daisy chain, e.g., 10(i+1) to provide a phase output signal DOUTi. Both of the phase input signal DINi and the phase output signal DOUTi could have one of three states, e.g., a high voltage level state, a low voltage level state, and a high impedance state, the control circuit 10i is capable of recognizing the three states of the phase input signal DINi and is capable of providing the phase output signal DOUTi having one of the three states. One of the control circuits 101-10N is configured as a master control circuit, and each of the rest of the remaining control circuits is configured as a slave control circuit. In one example, the phase input signal DINi of the control circuit 10i is a phase output signal DOUT(i−1) of the previous control circuit 10(i−1), and the phase output signal DOUTi of the control circuit 10i is a phase input signal DIN(i+1) of the latter control circuit 10(i+1).

In the example of FIG. 1, a control circuit 101 is configured as the master control circuit, and the rest of the control circuits 102-10N are configured as the slave control circuits. As can be appreciated, the master control circuit is not limited to the control circuit 101, any other control circuits 102-10N may be configured as the master control circuit in another example. In the example of FIG. 1, the master control circuit 101 provides a phase output signal DOUT1 and a switching control signal PWM1 to control a switching circuit 111 based on a turn-on control signal Set and a phase input signal DIN1, a slave control circuit 10x (x=2, . . . N) provides a phase output signal DOUTx and a switching control signal PWMx to control a switching circuit 11x based on a phase input signal DINx.

In the example of FIG. 1, each of the switching circuits 111-11N is a synchronous step-down circuit, comprising a high-side switch HSi, a low-side switch LSi, an inductor Li, and an output capacitor Ci. When a corresponding switching control signal PWM is logical high, a corresponding one of the switching circuits 111-11N is turned on to provide a power output, e.g., the high-side switch HSi is turned on and the low-side switch LSi is turned off. When the corresponding switching control signal PWM is logical low, the corresponding one of the switching circuits 111-11N is turned off to stop the power output, e.g., the high-side switch HSi is turned off and the low-side switch LSi is turned on.

In the example of FIG. 1, the multiphase switching converter 100 further comprises a sampling circuit 121, and a comparison circuit 122. The sampling circuit 121 samples the output voltage Vout, and provides a feedback signal Vfb representative of the output voltage Vout. The comparison circuit 122 receives the feedback signal Vfb and a reference signal Vref, and provides the turn-on control signal Set according to a comparing result between the feedback signal Vfb and the reference signal Vref.

FIG. 2 shows a working flowchart 201 of the multiphase switching converter 100 in accordance with an embodiment of the present invention. The flowchart 201 comprises steps S210 and S220.

At the step S210, in an initialization stage, the master control circuit 101 provides the switching control signal PWM1 to control the switching circuit 111 according to the turn-on control signal Set, and provides the phase output signal DOUT1 at the high voltage level state. If a combination of the phase output signal DOUT1 and the switching control signal PWM1 meets a phase transfer type, e.g., the phase output signal DOUT1 is at the high impedance state, and a time period after the switching circuit 111 turned on by the switching control signal PWM1 achieves a preset blanking time period Tbk, then the initialization stage is finished, the phase output signal DOUT1 equals the turn-on control signal Set. And when the phase input signal DIN1 transits to the high voltage level state, a control cycle of the control circuits 101-10N of the daisy chain architecture is finished, and the master control circuit 101 enters the initialization stage again. In one example, the phase transfer type is one of user-defined types to indicate that the latter one of the control circuits in the daisy chain architecture is ready to turn on the corresponding switching circuit.

At the step S220, when the phase input signal DINx is at the high impedance state, the slave control circuit 10x enters the initialization stage to initialize the phase output signal DOUTx at the high impedance state. When a first pulse appears on the phase input signal DINx after the phase input signal DINx exits the high impedance state, the switching circuit 11x is turned on by the switching control signal PWMx. And when the combination of the phase output signal DOUTx and the switching control signal PWMx meets the phase transfer type, e.g., the phase output signal DOUTx is at the high impedance state, and a time period after the switching circuit 11x turned on by the switching control signal PWMx achieves the preset blanking time period Tbk, the initialization stage is finished, and the phase output signal DOUTx equals the phase input signal DINx.

In the example shown in FIG. 1 and FIG. 2, each of the control circuits only needs one phase control input terminal and one phase control output terminal to realize cooperative operation, phase interleaving, automatically identifies the number of switching circuits needed, auto phase shedding and adding, and automatically fault handling. Further, when the control circuits are integrated into a chip, pins are saved.

Figure 3:
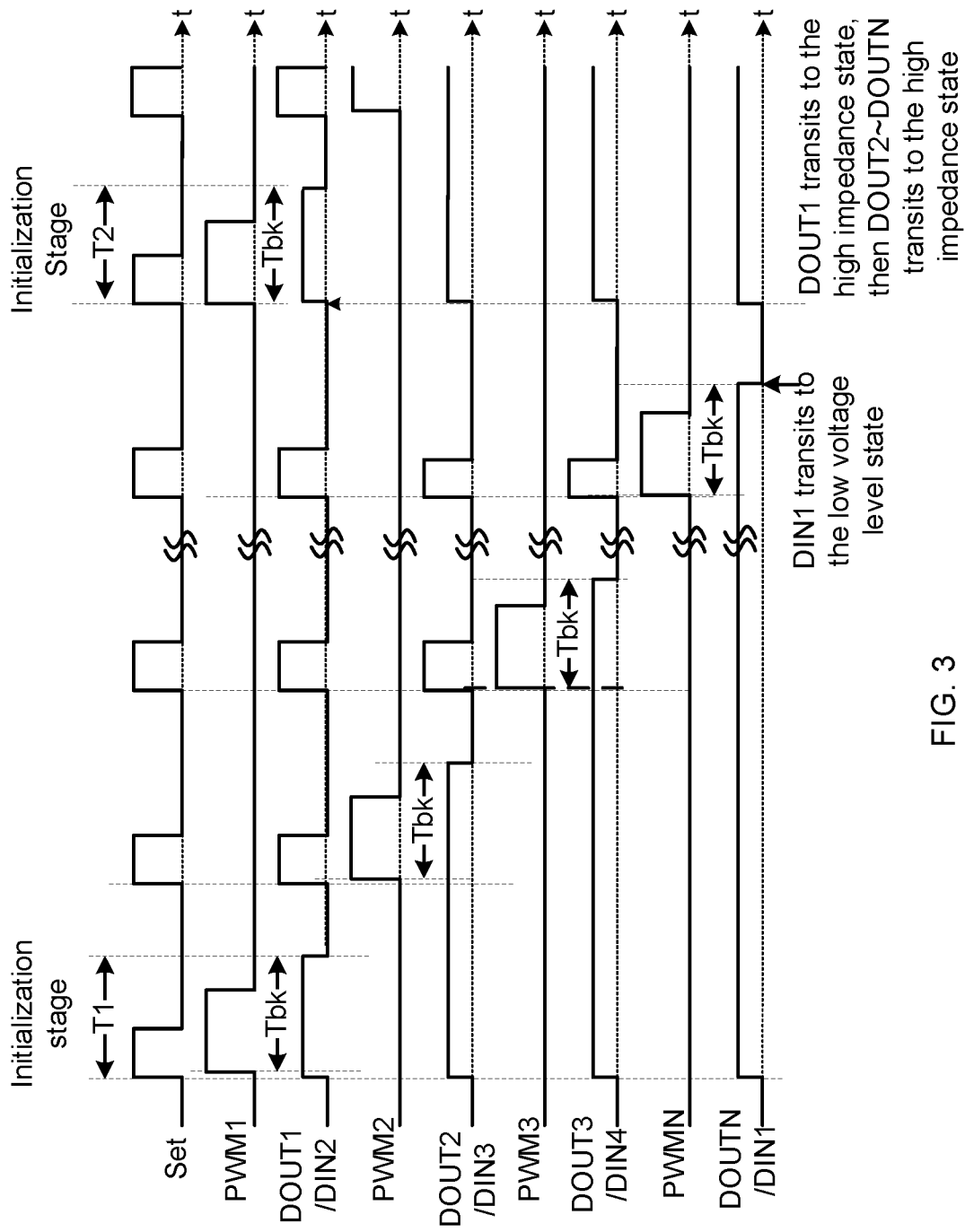
FIG. 3 shows a timing diagram of signals of the multiphase switching converter 100 during a normal operation in accordance with an embodiment of the present invention.

FIG. 3 shows a timing diagram of signals of the multiphase switching converter 100 during a normal operation in accordance with an embodiment of the present invention. During a time period T1 shown in FIG. 3, the multiphase switching converter 100 is connected to a power source and the master control circuit 101 enters the initialization stage. The master control circuit 101 provides the switching control signal PWM1 based on the turn-on control signal Set, and provides the phase output signal DOUT1 at the high impedance state. As shown in FIG. 3, in the initialization stage, when the pulse appears on the turn-on control signal Set, the switching circuit 111 is turned on by the switching control signal PWM1, and the phase output signal DOUT1 transits to the high impedance state. If the phase output signal DOUT1 is at the high impedance state, and the time period after the switching circuit 111 turned on achieves the preset blanking time period Tbk, the initialization stage is finished, the phase output signal DOUT1 equals the turn-on control signal Set.

During the time period T1 shown in FIG. 3, phase input signals DIN2-DINN of slave control circuits 102-10N becomes at the high impedance state, the slave control circuits 102-10N enters the initialization stage, and slave control circuits 102-10N provides phase output signals DOUT2-DOUTN at the high impedance state respectfully. When the pulse first appears on the phase input signal DINx after exiting the high impedance state, the switching control signal PWMx becomes at logical high to turn on the switching circuit 11x. As shown in FIG. 3, when the phase output signal DOUTx is at the high impedance state, and the time period after the switching control signal PWMx becoming logical high achieves the preset blanking time period Tbk, the initialization stage is finished, and the phase output signal DOUTx equals the phase input signal DINx.

When the phase input signal DIN1 becomes at the high voltage level state, the control cycle of the control circuits 101-10N of the daisy chain is finished, and the master control circuit 101 enters the initialization stage again as period T2 shown in FIG. 3, the master control circuit 101 provides the switching control signal PWM1 based on the turn-on control signal Set, and provides the phase output signal DOUT1 at the high impedance state, the slave control circuits 101-10N enters the initialization stage again, and the phase output signals DOUT2-DOUTN becomes at the high impedance state.

Figure 4:
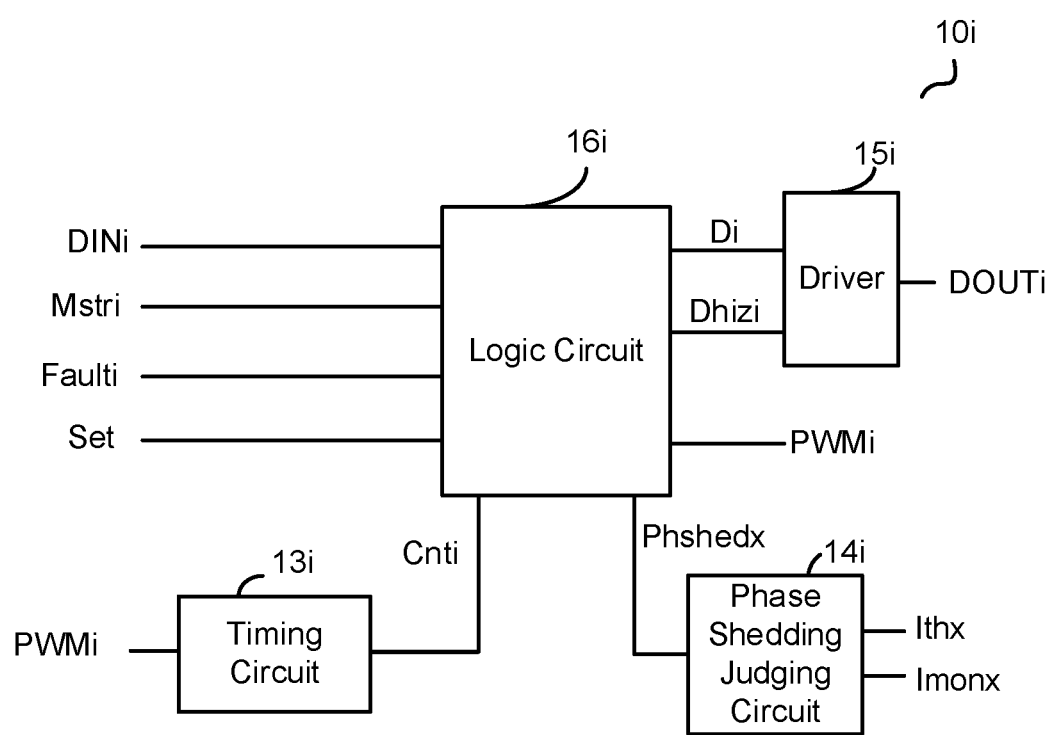
FIG. 4 illustrates a block diagram of a control circuit 10i in accordance with an embodiment of the present invention.

FIG. 4 illustrates a block diagram of a control circuit 10i in accordance with an embodiment of the present invention. The control circuit 10i comprises a logic circuit 16i, a timing circuit 13i, and a driver 15i. The timing circuit 13i starts timing based on the switching control signal PWMi and provides a timing signal Cnti accordingly. In one embodiment, when the switching control signal PWMi is logical high, the timing circuit 13i starts timing until the timing period reaches the preset blanking time period Tbk, the timing signal Cnti is configured to indicate that the timing is up, the timing circuit 13$i$ stops timing and is reset to initial. The logic circuit 16$i$ receives the phase input signal DINi, a master-slave configuration signal Mstri, a fault signal Faulti, the turn-on control signal Set, and the timing signal Cnti, and the logic circuit 16$i$ initializes the control circuit 10$i$ as the master control circuit or the slave control circuit according to the master-slave configuration signal Mstri. If the control circuit 10$i$ is configured as the mater control circuit, the logic circuit 16$i$ provides the switching control signal PWMi, a phase control signal Di, and a state control signal Dhizi based on the phase input signal DINi, the fault signal Faulti, the turn-on control signal Set and the timing signal Cnti. If the control circuit 10$i$ is configured as the slave control circuit, the logic circuit 16$i$ provides the switching control signal PWMi, the phase control signal Di, and the state control signal Dhizi based on the phase input signal DINi, the fault signal Daulti, and the timing signal Cnti.

The driver 15$i$ is coupled to the logic circuit 16$i$ to receive the phase control signal Di and the state control signal Dhizi, and provides the phase output signal DOUTi based on the phase control signal Di and the state control signal Dhizi. In one embodiment, when the state control signal Dhizi is at a first status, e.g., logical high, the phase output signal DOUTi is at the high impedance state, and when the state control signal Dhizi is at a second status, e.g., logical low, the phase output signal DOUTi is at the high voltage level state or the low voltage level state.

The control circuit 10$i$ further comprises a phase shedding judging circuit 14$i$. The phase shedding judging circuit 14$i$ receives a corresponding current sense signal Imonx and a phase shedding threshold Ithx, and provides a phase shedding control signal Phshedx based on a comparing result of the current sense signal Imonx and the phase shedding threshold Ithx, wherein the current sense signal Imonx represents a current flowing through the corresponding switching circuit 11$x$. When the control circuit 10$i$ is configured as the slave control circuit, the logic circuit 16$i$ further receives the phase shedding control signal Phshedx, and the logic circuit 16$i$ provides the switching control signal PWMi, the phase control signal Di, and the state control signal Dhizi further based on the phase shedding control signal Phshedx.

Figure 5:
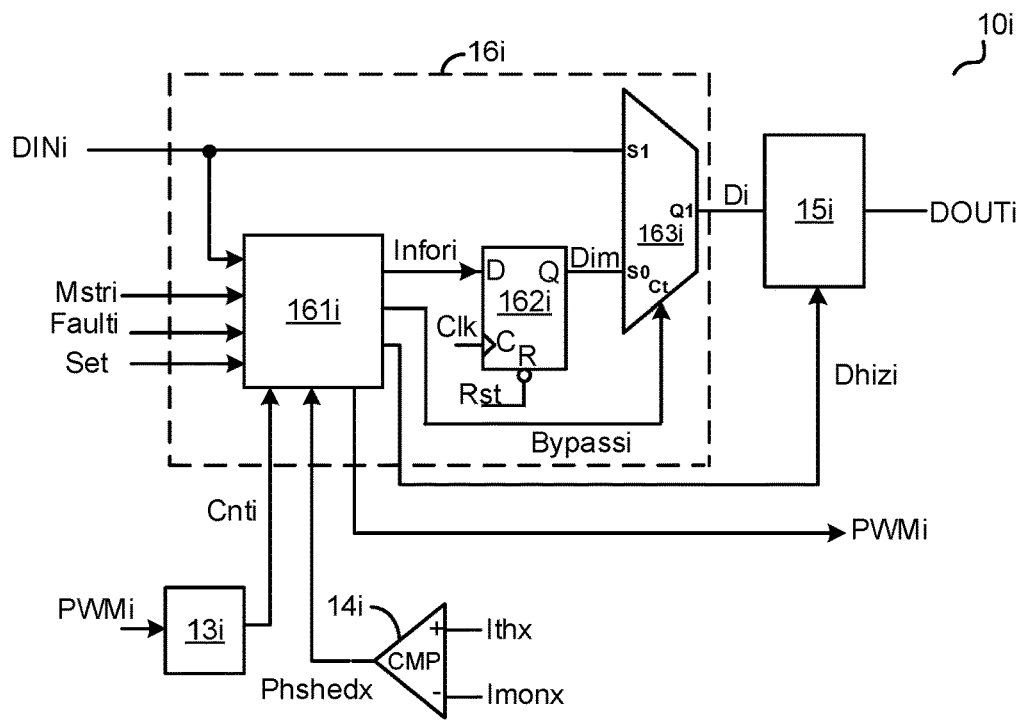
FIG. 5 schematically illustrates the control circuit 10i in accordance with an embodiment of the present invention.

FIG. 5 schematically illustrates the control circuit 10$i$ in accordance with an embodiment of the present invention. In the example of FIG. 5, the logic circuit 16$i$ further comprises a state machine (FSM) 161$i$, a D flip-flop 162$i$, and a selective circuit 163$i$. the FSM 161$i$ receives the maser-slave configuration signal Mstri, the phase input signal DINi, the fault signal Faulti, the turn-on control signal Set, the timing signal Cnti, and the phase shedding control signal Phshedx, and provides an information signal Infori, a bypass signal Bypassi, the state control signal Dhizi, and the switching control signal PWMi. Detailed states and transitions between the states of the sate machine 161$i$ are shown in FIG. 6. The D flip-flop 162$i$ comprises a data input terminal D, a clock terminal C, a reset terminal R, and an output terminal Q, the data input terminal D receives the information signal Infori, the clock terminal C receives a system clock Clk, the reset terminal R receives a reset signal Rst, and the output terminal Q provides an intermediate signal Dim. The D flip-flop 162$i$ updates the intermediate signal Dim on the rising or falling edge of the system clock Clk according to the information signal Infori. The selective circuit 163$i$ has a first input terminal S0, a second input terminal S1, a control terminal Ct, and an output terminal Q1, the first input terminal S0 of the selective circuit 163$i$ is coupled to the output terminal Q of the D flip-flop 162$i$, the second input terminal S1 of the selective circuit 163$i$ receives the phase input signal DINi, and the control terminal Ct of the selective circuit 163$i$ is coupled to the FSM 161$i$ to receive the bypass signal Bypassi, and the output terminal Q1 of the selective circuit 163$i$ provides the phase control signal Di. In one embodiment, when the bypass signal Bypassi is at the first status, e.g., logical high, to indicate that the current switching circuit 11$i$ should be bypassed, the phase control signal Di equals the phase input signal DINi, and when the bypass signal is at the second status, e.g., logical low, to indicate that the current switching circuit 11$i$ should not be bypassed, the selective circuit 163$i$ provides the phase control signal Di based on the intermediate signal Dim, to be more precise, based on the information signal Infori provided by the FSM 161$i$.

In the example shown in FIG. 5, the phase shedding judging circuit 14$i$ comprises a comparator CMP, having an inverting terminal, a non-inverting terminal and an output terminal, the non-inverting terminal of the comparator CMP receives the phase shedding threshold Ithx, and inverting terminal of the comparator CMP receives the current sense signal Imonx, and the output terminal of the comparator CMP provides the phase shedding control signal Phshedx via comparing the current sense signal Imonx with the phase shedding threshold Ithx.

Figure 6A:
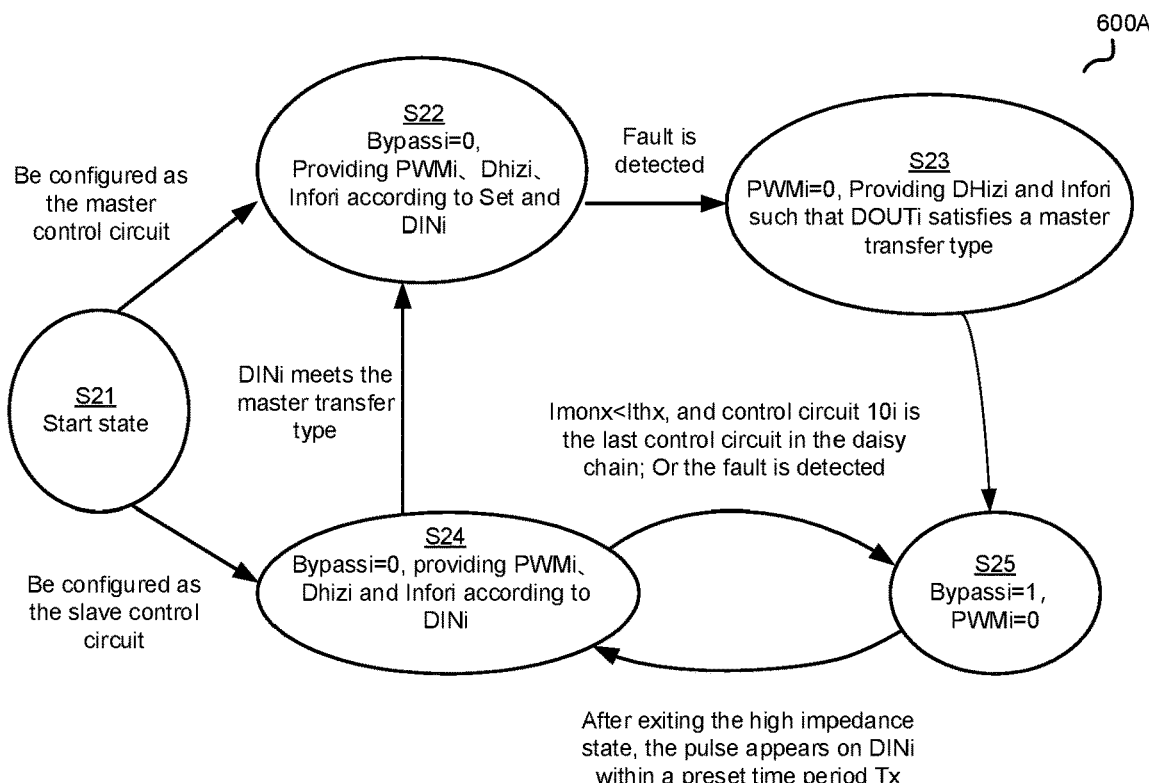
FIG. 6A illustrates a state transition diagram 600A of a state machine 161i of FIG. 5 in accordance with an embodiment of the present invention.

FIG. 6A illustrates a state transition diagram 600A of a state machine 161$i$ of FIG. 5 in accordance with an embodiment of the present invention. In the example shown in FIG. 6A, the control circuit 10$i$ operates in a start state S21, a master control circuit operating state S22, a fault state S23 for the master control circuit, a slave control circuit operating state S24, or a bypass state S25.

The start state S21 comprises connecting the control circuit 10$i$ to a power supply. When be configured as the master control circuit, the control circuit 10$i$ transits to the master control circuit operating state S22 from the start state S21, and when be configured as the slave control circuit, the control circuit 10$i$ transits to the slave control circuit operating state S24.

The master control circuit operating state S22 comprises providing the bypass signal Bypassi at the second status, e.g., at logical low, providing the switching control signal PWMi, the state control signal Dhizi and the information signal Infori according to the turn-on control signal Set and the phase input signal DINi. When the fault is detected, the control circuit 10$i$ transits to the fault state S23 for master control circuit.

The fault state S23 for the master control circuit comprises providing the switching control signal PWMi at logical low to stop the power output by the switching circuit 11$i$, and providing the state control signal Dhizi and the information signal Infori such that the phase output signal DOUTi satisfies a master transfer type. In one example, the master transfer type is one of the user-defined types to indicate that the master control circuit should transfer to other control circuits, i.e., one of the other control circuits will be reconfigured as the master control circuit. The master transfer type comprises at least one of transiting to the low voltage level state from the high impedance state and then transiting to the high voltage level state, and transiting to the high voltage level state from the high impedance state and then transiting to the low voltage level state. Then the control circuit 10$i$ transits to the bypass state S25.

The slave control circuit operating state S24 comprises providing the bypass signal Bypassi at the second status, e.g., at logical low, and providing the switching control signal PWMi, the state control signal Dhizi, and the information signal Infori according to the phase input signal DINi. When the phase input signal DINi meets the master transfer type, the control circuit 11i transits to the master control circuit operating state S22. When the current sense signal Imonx is less than the phase shedding threshold Ithx, if the control circuit 10i is the last one in the daisy chain architecture or if the fault is detected, the control circuit 10i transits to the bypass state S25. In one example, the fault is detected if the pulse on the phase input signal DINi lasts within a preset time period Tpre0.

The bypass state S25 comprises providing the bypass signal Bypassi at the first status, e.g., at logical high, providing the phase output signal DOUTi equaling the phase input signal DINi, providing the switching control signal PWMi at logical low to maintain the switching circuit 11i off. After the phase input signal DINi exits the high impedance state, when the pulse appears on the phase input signal DINi within a preset time period Tx, the control circuit 10i transits to the slave control circuit operating state S24.

Figure 6B:
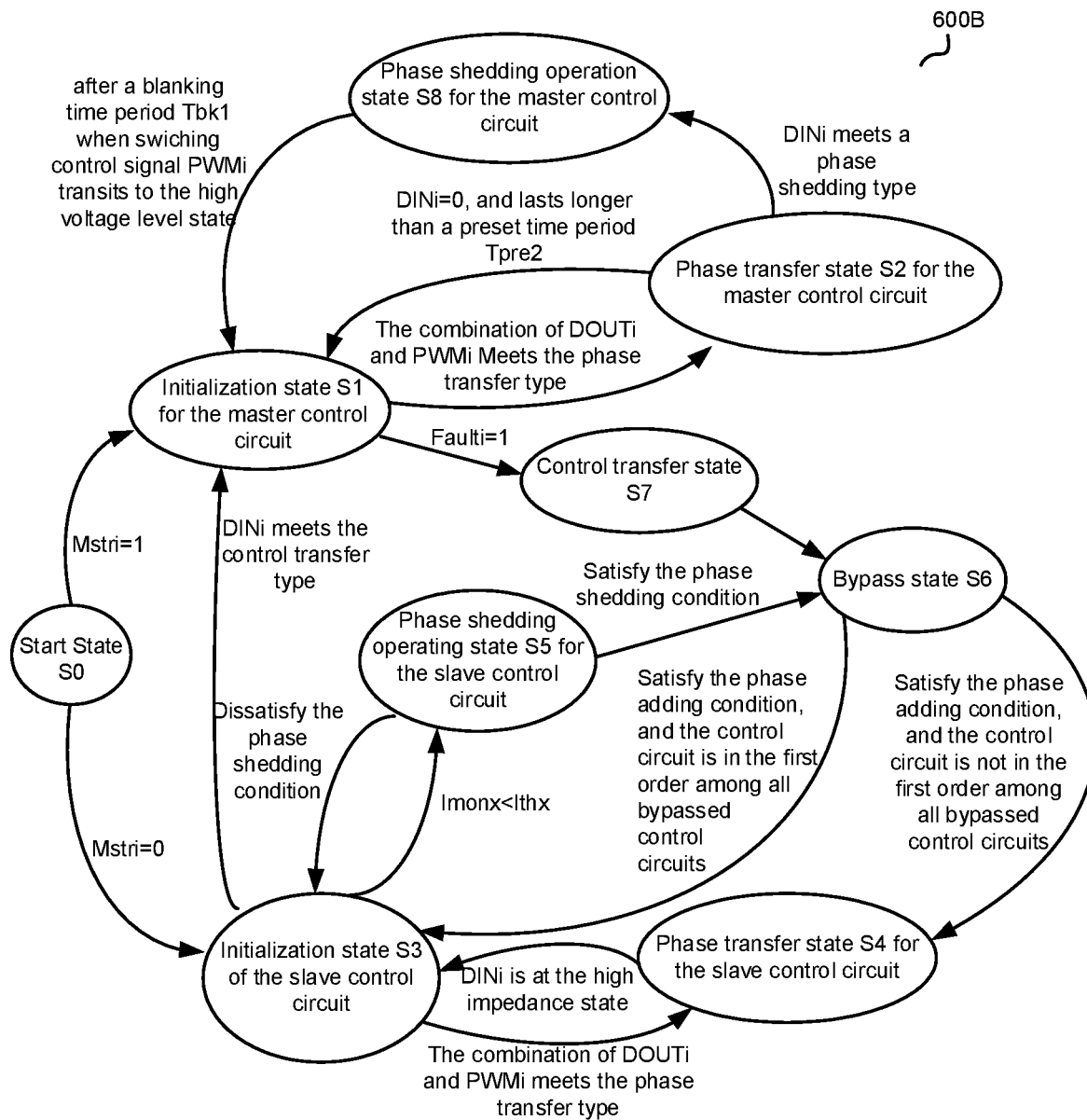
FIG. 6B illustrates a state transition diagram 600B of the state machine 161i of FIG. 5 in accordance with another embodiment of the present invention.

FIG. 6B illustrates a state transition diagram 600B of the state machine 161i of FIG. 5 in accordance with another embodiment of the present invention. In the example shown in FIG. 6B, the control circuit 10i operates in a start state S0, an initialization state S1 for the master control circuit, a phase transfer state S2 for the master control circuit, an initialization state S3 for the slave control circuit, a phase transfer state S4 for the slave control circuit, a phase shedding operating state S5 for the slave control circuit, a bypass state S6, a control transfer state S7, or a phase shedding operating state S8 for the master control circuit.

The start state S0 comprises connecting the control circuit 10i to the power supply. When the maser-slave configuration signal Mstri is logical high, the control circuit 10i transits to the initialization state S1 from the start state S0. When the master-slave configuration signal Mstri is logical low, the control circuit 10i transits to the initialization state S2 from the start state S0.

The initialization sate S1 for the master control circuit comprises initializing the control circuit 10i as the master control circuit, providing the switching control signal PWMi based on the turn-on control signal Set, e.g., when the pulse appears on the turn-on control signal Set, the switching circuit 11i is turned on by the switching control signal PWMi, providing the state control signal Dhizi at the first status, so that the phase output signal DOUTi is at the high impedance state, and provide the bypass signal Bypassi at the second status.

When the combination of the phase output signal DOUTi and the switching control signal PWMi meets the phase transfer type, e.g., the phase output signal DOUTi is at the high impedance state, and a time period after the switching circuit 11i turned on by the switching control signal PWMi achieves the preset blanking time period Tbk, the control circuit 10i transits to the phase transfer state S2 for the master control circuit from the initialization sate S1 for the master control circuit.

When the fault signal Faulti is logical high for example, the control circuit 10i transits to the control transfer state S7 from the initialization sate S1 for the master control circuit.

The phase transfer state S2 for the master control circuit comprises providing the state control signal Dhizi at the second status, providing the bypass signal Bypassi at the second status, and providing the information signal Infori based on the turn-on control signal Set, so that the phase output signal DOUTi equals the turn-on control signal Set.

When the phase input signal DINi is at the low voltage level state, and lasts longer than a preset time period Tpre2, the control circuit 10i transits to the initialization sate S1 for the master control circuit from the phase transfer state S2 for the master control circuit.

When the phase input signal DINi meets a phase shedding type, the control circuit 10i transits to the phase shedding operation state S8 for the master control circuit from the phase transfer state S2 for the master control circuit. In one example, the phase shedding type is one of the user-defined types to indicate that one or more switching circuits need to stop power output per load current reduced.

The initialization state S3 for the slave control circuit comprises initializing the control circuit 10i as the slave control circuit, providing the switching control signal PWMi based on the phase input signal DINi, e.g., when the pulse appears on the phase input signal DINi, the switching circuit 11i is turned on by the switching control signal PWMi, providing the state control signal Dhizi at the first status, so that the phase output signal DOUTi is at the high impedance state, and providing the bypass signal Bypassi at the second status.

When the combination of the phase output signal DOUTi and the switching control signal PWMi meets the phase transfer type, the control circuit 10i transits to the phase transfer state S4 for the slave control circuit from the initialization state S3 for the slave control circuit.

When the current sense signal Imonx is less than the phase shedding threshold Ithx, the control circuit 10i transits to the phase shedding operating state S5 for the slave control circuit from the initialization state S3 for the slave control circuit.

When the phase input signal DINi meets the master transfer type, the control circuit 10i transits to the initialization sate S1 for the master control circuit from the initialization state S3 for the slave control circuit.

The phase transfer state S4 for the slave control circuit comprises providing the state control signal Dhizi at the second status, and providing the bypass signal Bypassi at the first status, so that the phase output signal DOUTi equals the phase input signal DINi.

When the phase input signal DINi is at the high impedance state, the control circuit 10i transits to the initialization state S3 for the slave control circuit from the phase transfer state S4 for the slave control circuit.

The phase shedding operating state S5 for the slave control circuit comprises when the phase input signal DINi transits to the high voltage level state, providing the state control signal Dhizi and the information signal Infori so that the phase output signal DOUTi satisfies the phase shedding type, and providing the phase output signal DOUTi transits to the high voltage level state from the high impedance state.

When a phase shedding condition is dissatisfied, the control circuit 10i transits to the initialization state S3 for the slave control circuit from the phase shedding operation stage S5 for the slave control circuit. When the phase shedding condition is satisfied, the control circuit 10i transits to the bypass state S6 from the phase shedding operation stage S5 for the slave control circuit. In one example, the phase shedding condition comprises after providing the phase output signal DOUTi satisfying the phase shedding type, the pulse on the phase input signal DINi lasts within the preset time period Tpre0. In another example, the phase shedding condition comprises the control circuit 10i is the last one in the daisy chain.

The bypass state S6 comprises turning off the switching circuit 11i by the switching control signal PWMi, providing the state control signal Dhizi at the second status, and providing the bypass signal Bypassi at the first status, so that the phase output signal DOUTi equals the phase input signal DINi. In one example, the control circuit is bypassed to turn off the corresponding switching circuit, i.e., stop the power output of the corresponding switching circuit.

When a phase adding condition is satisfied, and when the control circuit 10i is in the first order among all bypassed control circuits, the control circuit 10i transits to the initialization state S3 for the slave control circuit from the bypass state S6.

When the phase adding condition is satisfied, and when the control circuit 10i is not in the first order among all bypassed control circuits, the control circuit 10i transits to the phase transfer state S4 for the slave control circuit from the bypass state S6. In one example, the phase adding condition comprises that the pulse appears on the phase input signal DINi within the preset time period Tx after the phase input signal DINi exiting the high impedance state. In one example, when the pulse appears on the phase input signal DINi within the preset time period Tx after the phase input signal DINi exiting the high impedance state, and when a time period the pulse lasting longer than the preset time period Tpre1, it is judged that the control circuit 10i is in the first order. In one example, when the pulse appears on the phase input signal DINi within the preset time period Tx after the phase input signal DINi exiting the high impedance state, and when the time period the pulse lasting is shorter than the preset time period Tpre1, it is judged that the control circuit 10i is not in the first order.

The control transfer state S7 comprises providing the phase output signal DOUTi satisfying the master transfer type, and then the control circuit 10i transits to the bypass state S6 from the control transfer state S7.

The phase shedding operation state S8 for the master control circuit comprises turning on the switching circuit 11i by the switching control signal PWMi, and providing the phase output signal DOUTi at the low voltage level state. After the preset blanking time period Tbk1 that the switching control signal PWM1 becomes logical high, the control circuit 10i transits to the initialization sate S1 for the master control circuit.

In one example, the master control circuit operating state S22 shown in FIG. 6A comprises the initialization sate S1 for the master control circuit, the phase transfer state S2 for the master control circuit, and the phase shedding operating state S8 for the master control circuit shown in FIG. 6B. In one example, the slave control circuit operating state S24 shown in FIG. 6A comprises the initialization state S3 for the slave control circuit, the phase transfer state S4 for the slave control circuit, and the phase shedding operating state S5 for the slave control circuit.

Phase Shedding and Phase Adding Operation

Figure 7:
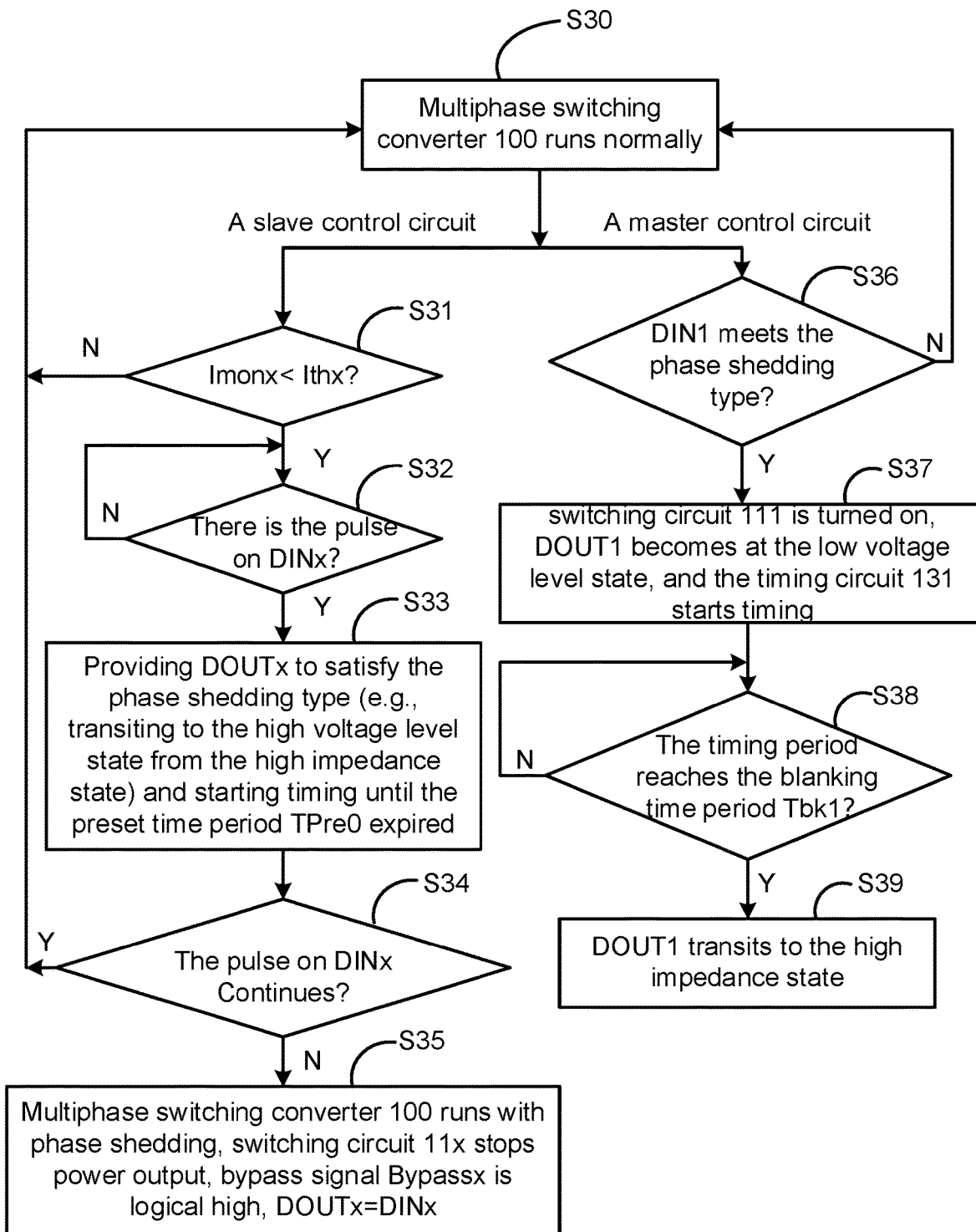
FIG. 7 shows a working flowchart of the multiphase switching converter 100 transiting to a phase shedding operation from the normal operation in accordance with an embodiment of the present invention.

FIG. 7 shows a working flowchart of the multiphase switching converter 100 transiting to a phase shedding operation from the normal operation in accordance with an embodiment of the present invention, comprising steps S30-S39.

At the step S30, the multiphase switching converter 100 runs normally. The steps S31-S35 show the working flow of a slave control circuit, and the steps S36-S39 show the working flow of a master control circuit.

At the step S31, when the current sense signal Imonx is less than the phase shedding threshold Ithx, go to the step S32. The phase shedding threshold Ithx for each switching circuit 11x could be same or different with each other.

At the step S32, judging if there is the pulse on the phase input signal DINi, if yes, then go to step S33.

At the step S33, providing the phase output signal DOUTx to satisfy the phase shedding type and starting timing until the preset time period Tpre0 expired, the phase shedding type for example comprises transiting to the high voltage level state from the high impedance state.

At the step S34, judging if the pulse on the phase input signal DINx continues to be logical high, if yes, then go back to the step S30, otherwise go to the step S35.

At the step S35, the multiphase switching converter 100 runs with phase shedding, the control circuit 10x enters the bypass state S25 shown in FIG. 6A or the bypass state S6 shown in FIG. 6B, the switching circuit 11x stops power output via the switching control signal PWMx, the bypass signal Bypassi is logical high, and the phase output signal DOUTx equals the phase input signal DINx.

At the step S36, if the phase input signal DIN1 meets the phase shedding type, then go to the step S37.

At the step S37, the switching circuit 111 is turned on by the switching control signal PWM1, the phase output signal DOUT1 becomes at the low voltage level state, and the timing circuit 131 starts timing.

At the step S38, if the timing period reaches the preset blanking time period Tbk1, then go to the step S39.

At the step S39, the phase output signal DOUT1 transits to the first state, e.g., at high impedance state.

The multiphase switching converter 100 could automatically adjust the number of switching circuits in operation, i.e., auto phase shedding and phase adding, according to load current.

Figure 8:
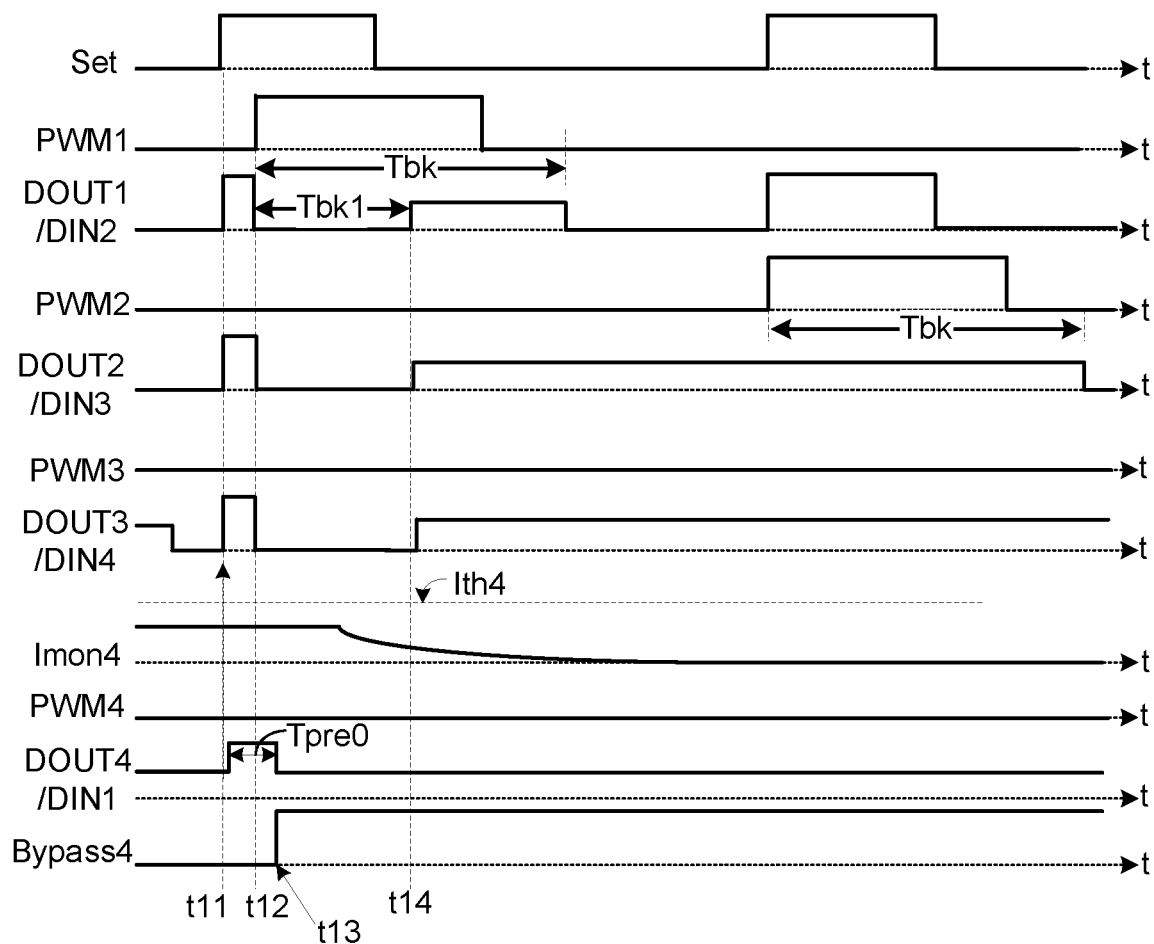
FIG. 8 shows a timing diagram of signals of the multiphase switching converter 100 entering the phase shedding operation in accordance with an embodiment of the present invention.

FIG. 8 shows a timing diagram of signals of the multiphase switching converter 100 entering the phase shedding operation in accordance with an embodiment of the present invention. In FIG. 8, the multiphase switching converter 100 comprises four switching circuits coupled in parallel as an example. As shown in FIG. 8, a current sense signal Imon4 for a switching circuit 114 is less than a phase shedding threshold Ith4. At time t11, the pulse appears on a phase input signal DIN4, then the slave control circuit 104 provides a phase output signal DOUT4 satisfying the phase shedding type, e.g., the phase output signal DOUT4 transits to the high voltage level state from the high impedance state. At time t12, the master control circuit 101 recognizes that the phase input signal DIN1 has the phase shedding type, and then the switching circuit 111 is turned on by the switching control signal PWM1, phase output signal DOUT1 becomes low, timing circuit 131 starts timing. After the preset time period Tpre0 when the phase output signal DOUT4 meets the phase shedding type, at time t13 as shown in FIG. 8, the phase input signal DIN4 is low, and the multiphase switching converter 100 enters the phase shedding operation successfully, so that the switching circuit 114 stops output power and the bypass signal Bypass4 is at the first status, e.g., logical high, the phase output signal DOUT4 equals the phase input signal DIN4. At time t14, the timing period timed by the timing circuit 131, i.e., the time period the switching control signal PWM1 maintains high, reaches the preset blanking time period Tbk1, the master control circuit 101 enters the initialization stage, e.g., enters the initialization state S1 for the master control circuit shown in FIG. 6B, the phase output signal DOUT1 is initialized to the high impedance state, and the phase output signal DOUT2-DOUT3 is initialized in turn to the high impedance state, the slave control circuits 102-103 respectively enter the initialization state S3 for the slave control circuit shown in FIG. 6B. During the initialization stage of the master control circuit 101, if the phase output signal DOUT1 is at the high impedance state, and a time period that the switching control signal PWM1 maintains high achieves the preset blanking time period Tbk1, and if the combination of the phase output signal DOUT1 and he switching control signal PWM1 meets the phase transfer type, the master control circuit 101 enters the phase transfer state S2 for the master control circuit shown in FIG. 6B, the phase output signal DOUT1 equals the turn-on control signal Set.

Figure 9:
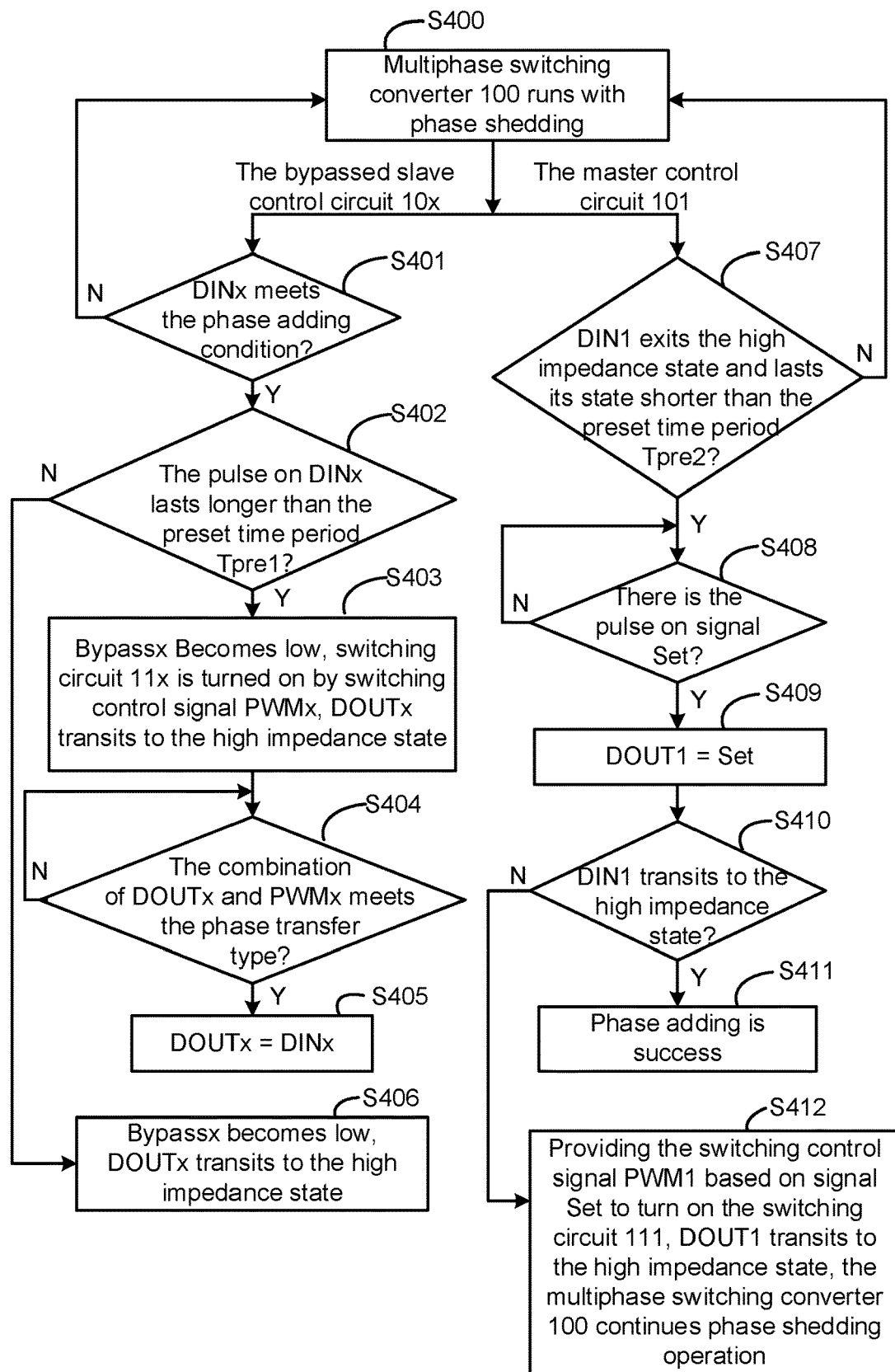
FIG. 9 shows a working flowchart of the multiphase switching converter 100 transiting to the normal operation from the phase shedding operation in accordance with an embodiment of the present invention.

FIG. 9 shows a working flowchart of the multiphase switching converter 100 transiting to the normal operation from the phase shedding operation in accordance with an embodiment of the present invention, comprising steps S400-S412.

At the step S400, the multiphase switching converter 100 runs with phase shedding. Steps S401-S406 shows the working flow of the bypassed slave control circuit 10x, and steps S407-S412 shows the working flow of the master control circuit 101.

At the step S401, judging if the phase input signal DINx of the bypassed slave control circuit 10x meets the phase adding condition, e.g., the pulse appears on the phase input signal DINx after the phase input signal DINx exits the high impedance state. If yes, then go to the step S402; otherwise, go back to the step S400.

At the step S402, judging if a time period of the pulse on the phase input signal DINx lasts longer than the preset time period Tpre1, if yes, the control circuit 10x is judged as in the first order, and then go to the step S403, otherwise go to the step S406.

At the step S403, the bypass signal Bypassi becomes low, switching circuit 11x is turned on by the switching control signal PWMx, the phase output signal DOUTx transits to the high impedance state.

At the step S404, judging if the combination of the phase output signal DOUTx and the switching control signal PWMx meets the phase transfer type, if yes, then go to the step S405.

At the step S405, the phase output signal DOUTx equals the phase input signal DINx.

At the step S406, the bypass signal Bypassi becomes low, the phase output signal DOUTx transits to the high impedance state.

At the step S407, judging if the phase input signal DIN1 exits the high impedance state and lasts its state shorter than the preset time period Tpre2, if yes, then go to the step S408.

At the step S408, when the pulse appears on the turn-on control signal Set, then go to the step S409.

At the step S409, the phase output signal DOUT1 equals the turn-on control signal Set.

At the step S410, judging if the phase input signal DIN1 transits to the high impedance state, if yes, then go to the step S411, otherwise go to the step S412.

At the step S411, phase adding is success, and the multiphase switching converters enters normal operation.

At the step S412, providing the switching control signal PWM1 based on the turn-on control signal Set to turn on the switching circuit 111, the phase output signal DOUT1 transits to the high impedance state, and the multiphase switching converter continues phase shedding operation.

Figure 10:
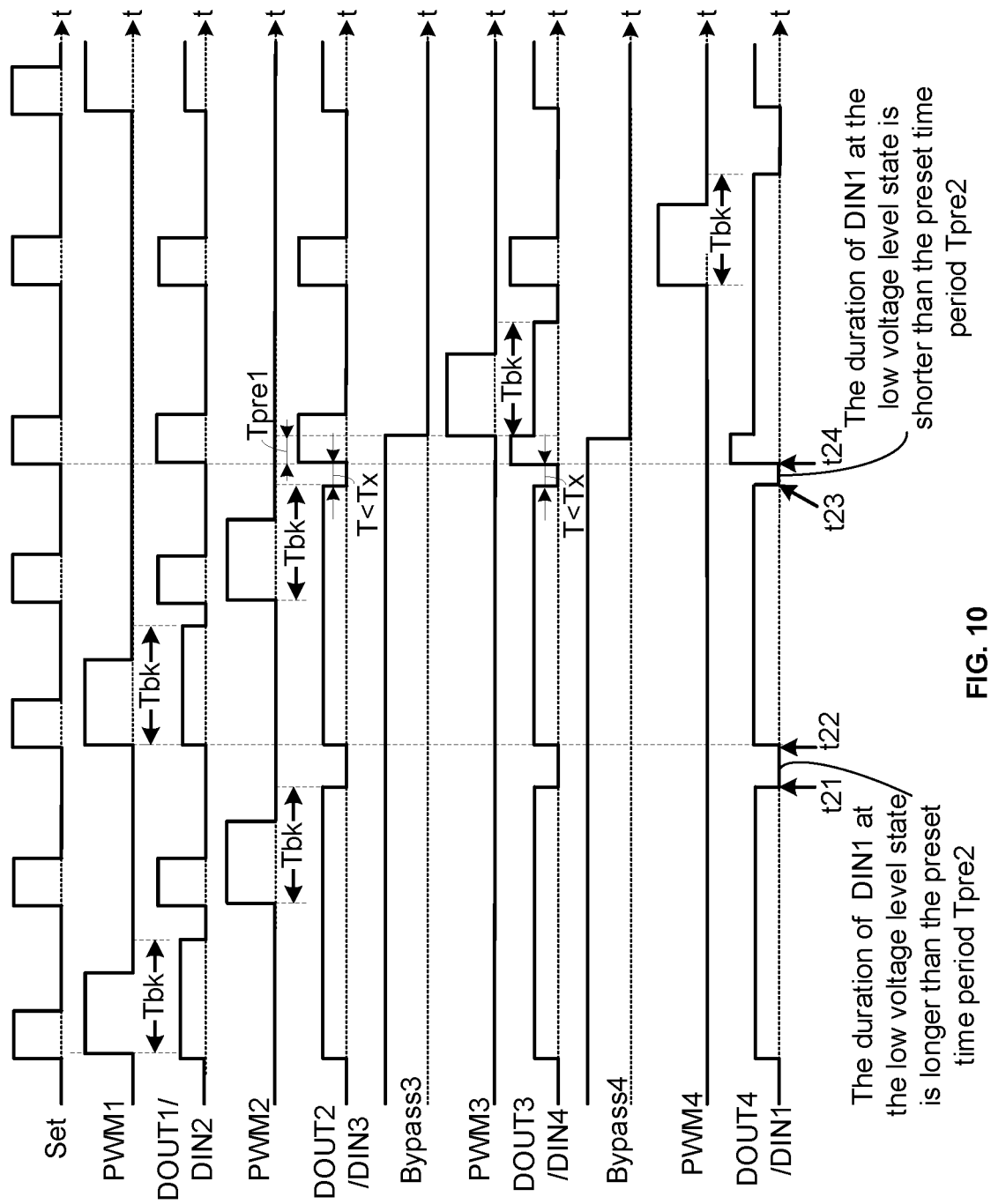
FIG. 10 shows a timing diagram of signals of the multiphase switching converter 100 resuming the normal operation from the phase shedding operation in accordance with an embodiment of the present invention.

FIG. 10 shows a timing diagram of signals of the multiphase switching converter 100 resuming the normal operation from the phase shedding operation in accordance with an embodiment of the present invention. In FIG. 10, the multiphase switching converter 100 comprises four switching circuits coupled in parallel as an example. As shown in FIG. 10, when a bypass signal Bypass3 is logical high, a switching circuit 113 stops power output, and the phase output signal DOUT3 equals the phase input signal DIN3. When a bypass signal Bypass4 is logical high, a switching circuit 114 stops power output, the phase output signal DOUT4 equals the phase input signal DIN4. At time t21, the phase input signal DIN1 exits the high impedance state, e.g., transits to the low voltage level state, and lasts its state longer than the preset time period Tpre2, as shown in FIG. 10, the duration of the phase input signal DIN1 at the low voltage level state is longer than the preset time period Tpre2. At time t22, when the pulse appears on the turn-on control signal Set, the master control circuit 101 enters the initialization stage, the switching circuit 111 is turned on by the switching control signal PWM1, the phase output signal DOUT1 transits to the high impedance state. The phase output signal DOUT2-DOUT4 transit to the high impedance state accordingly, and the multiphase switching converter 100 continues operating under phase shedding. At time t23, the phase input signal Din exits the high impedance state, e.g., transits to the low voltage level state, and lasts its state shorter than the preset time period Tpre2, as shown in FIG. 10, the duration of the phase input signal DIN1 at the low voltage level state is shorter than the preset time period Tpre2, and the pulse appears on the turn-on control signal Set, so the phase output signal DOUT1 equals the turn-on control signal Set. As a result, the pulse appears on the phase output signal DOUT1. At time t24, the phase input signal DIN3 meets the phase adding condition, e.g., the phase input signal DIN3 transits to the low voltage level state from the high impedance state, and then the pulse appears on the phase input signal DIN3 within the preset time period Tx, while the phase input signal DIN4 meets the phase adding condition too. The bypassed slave control circuit 103 meets the phase adding condition, and the bypassed slave control circuit 103 is in the first order among all bypassed control circuits (103 and 104), the slave control circuit 103 enters the initialization state S3 for the slave control circuit. The bypassed slave control circuit 104 is not in the first order among all bypassed control circuits, so the slave control circuit 104 enters the phase transfer state S4 for the slave control circuit. As shown in FIG. 10, the pulse on the phase input signal DIN3 lasts longer than the preset time period Tpre1, the bypassed signal Bypass3 becomes low, so that the switching circuit 113 is turned on by the switching control signal PWM3, the phase output signal DOUT3 becomes the high impedance state, that is the multiphase switching converter achieves the phase adding successfully. The pulse on the phase input signal DIN4 lasts shorter than the preset time period Tpre1, the bypass signal Bypass4 becomes low, the phase output signal DOUT4 transits to the high impedance state.

Fault Protection of the Multiphase Switching Converter

Figure 11:
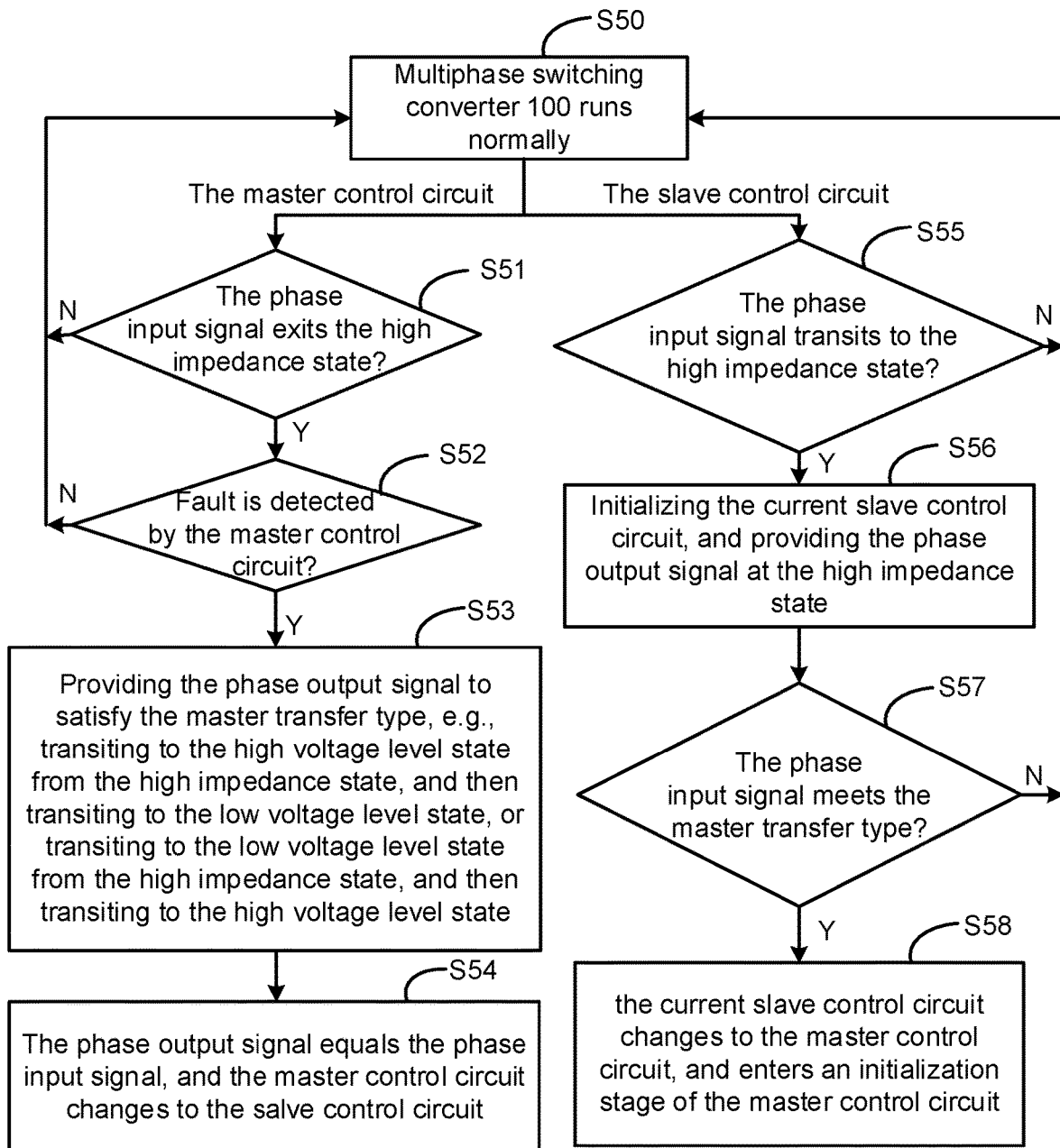
FIG. 11 shows a working flowchart of the multiphase switching converter 100 during a fault protection in accordance with an embodiment of the present invention.

FIG. 11 shows a working flowchart of the multiphase switching converter 100 during a fault protection in accordance with an embodiment of the present invention, comprising steps S50-S58.

At the step S50, the multiphase switching converter 100 runs normally, comprising but not limited to operating under phase shedding or operates under all phase running. The steps S51-S54 shows the working flow of the master control circuit, and the steps S55-S58 shows the working flow of the slave control circuit.

At the step S51, if the phase input signal of the master control circuit exits the high impedance state, e.g., at the low voltage level state, then go to the step S52, otherwise go back to the step S50.

At the step S52, judging if there is any fault detected by the master control circuit, if yes, then go to the step S53; otherwise go back to the step S50.

At the step S53, providing the phase output signal to satisfy the master transfer type, e.g., transiting to the high voltage level state from the high impedance state, and then transiting to the high voltage level state from the high voltage level state. In another example, the master transfer type comprises the phase output signal transiting to the high voltage level state from the high impedance state, and then transiting to the high voltage level state from the low voltage level state.

At the step S54, the phase output signal equals the phase input signal, and the master control circuit changes to the slave control circuit.

At the step S55, judging if the phase input signal of the slave control circuit transits to the high impedance state, if yes, then go to the step S56.

At the step S56, initializing the current slave control circuit, and providing the phase output signal of the slave control circuit at the high impedance state.

At the step S57, judging if the phase input signal of the slave control circuit meets the master transfer type, if yes, then go to the step S58, otherwise, go back to the step S50.

At the step S58, the current slave control circuit changes to the mater control circuit, and enters the initialization stage of the master control circuit.

Figure 12:
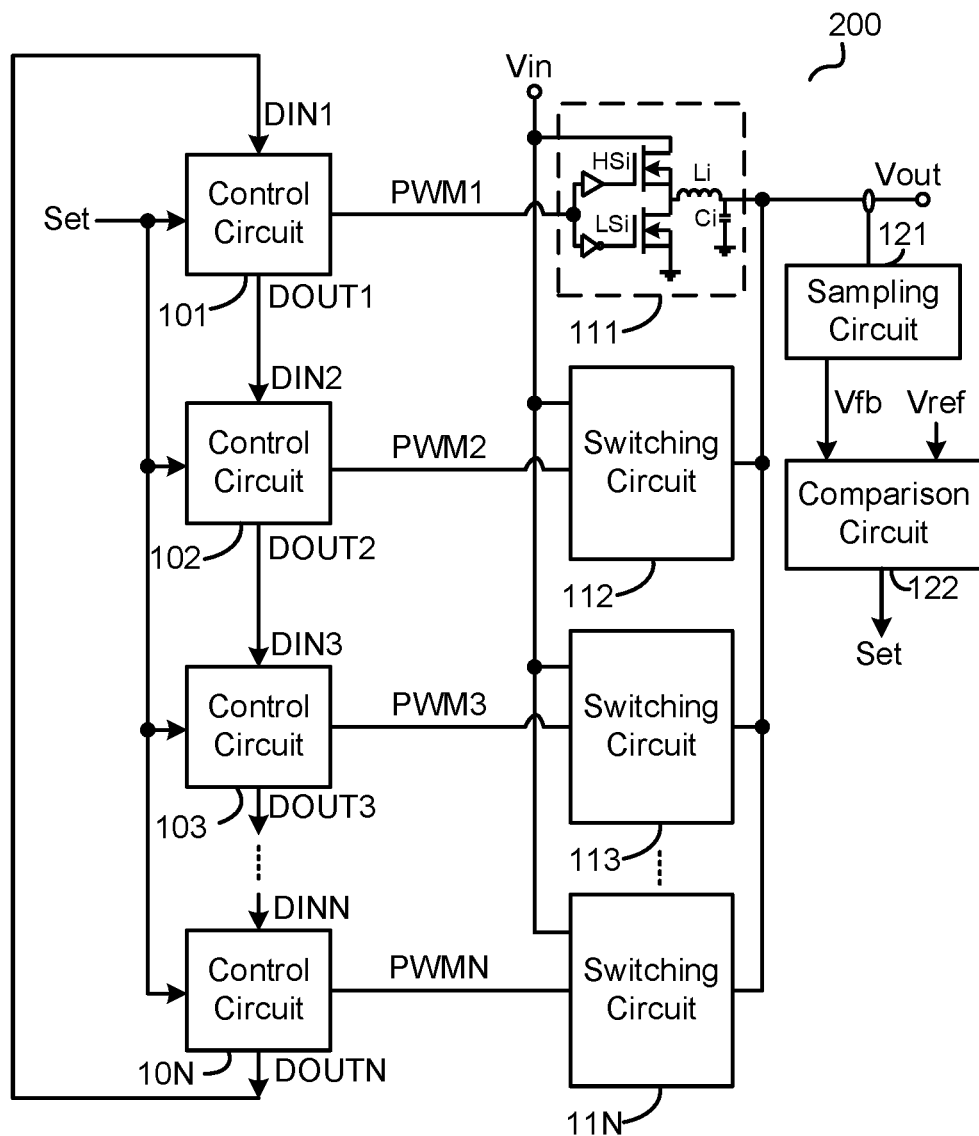
FIG. 12 illustrates a block diagram of a multiphase switching converter 200 in accordance with an embodiment of the present invention.

FIG. 12 illustrates a block diagram of a multiphase switching converter 200 in accordance with an embodiment of the present invention. In the example of FIG. 12, each of the control circuits 101-10N receives the turn-on control signal Set. One of the control circuits 101-10N is configured as the master control circuit to provide the corresponding switching control signal and a corresponding phase output signal based on the turn-on control signal Set and a corresponding phase input signal. Others of the control circuits 101-10N are configured as the slave control circuits, and each of the slave control circuits provides a corresponding switching control signal and a phase output signal based on a corresponding phase input signal. The slave control circuits do not directly use the turn-on control signal Set to generate the switching control signals and the phase output signals.

Figure 13:
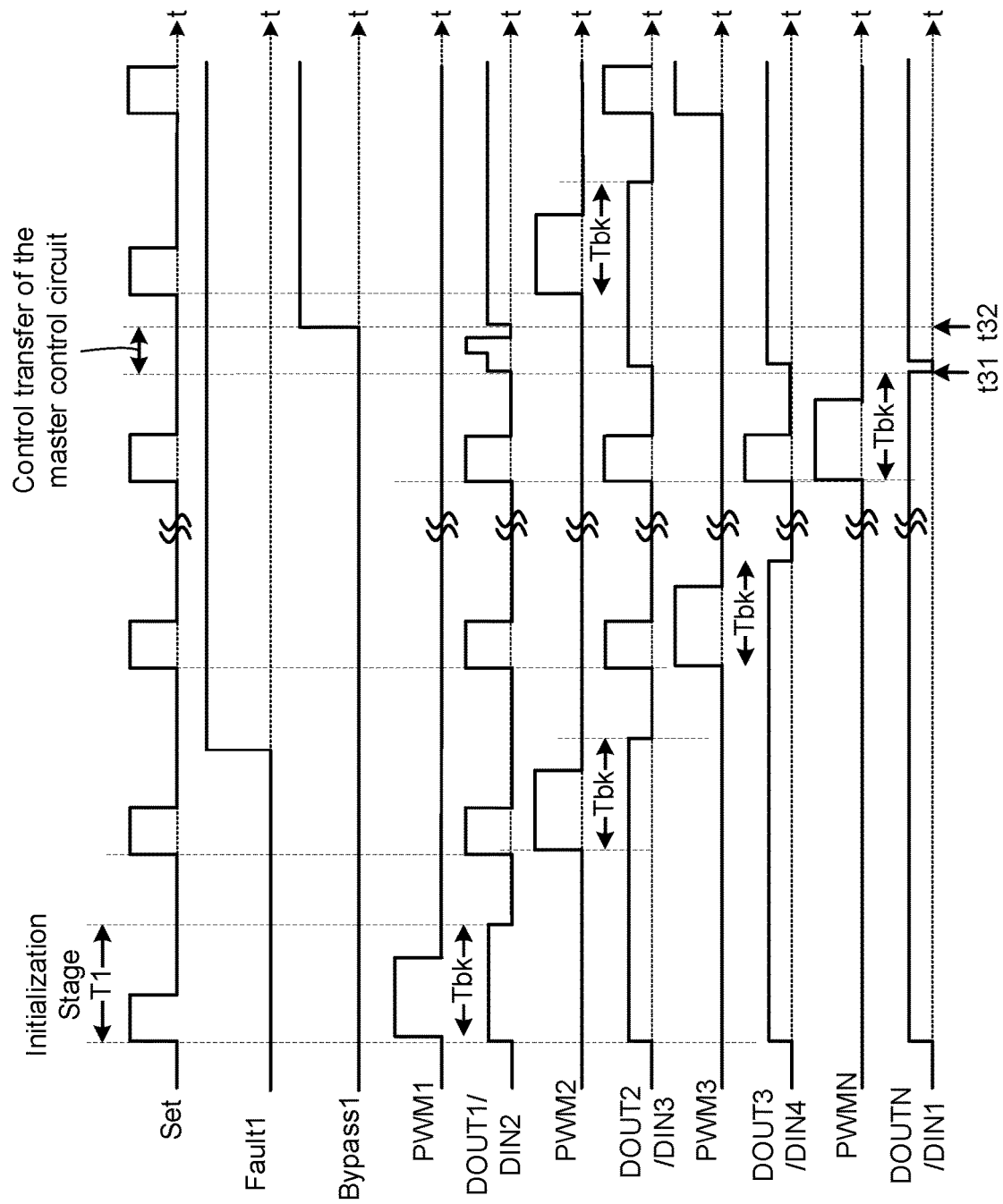
FIG. 13 shows a timing diagram of signals of the multiphase switching converter 100 during the fault protection.

FIG. 13 shows a timing diagram of signals of the multiphase switching converter 100 during the fault protection. At time t31, the phase input signal DIN1 exits the high impedance state, e.g., at the low voltage level state, the master control circuit 101 enters the initialization stage, the fault signal Fault1 is logical high to indicate that the fault happens, and the fault is detected by the master control circuit 101 at time t31, the master control circuit 101 provides the phase output signal DOUT1 satisfying the master transfer type, and then the bypass signal Bypass1 becomes logical low to bypass the control circuit 101, the phase output signal DOUT1 equals the phase input signal DIN1. The switching control signal PWM1 maintains logical low to maintain the switching circuit 111 off. In the example shown in FIG. 13, the master transfer type comprises transiting to the high voltage level state from the high impedance state, and then transiting to the low voltage level. When the phase input signal DIN2 of the slave control circuit 102 transits to the high impedance state, the slave control circuit 102 is initialized to provide the phase output signal DOUT2 at the high impedance state, the slave control circuits 103-10N enters the initialization stage to provide the phase output signal DOUT3-DOUTN at the high impedance state successively. At time t32, the phase input signal DIN2 meets the master transfer type, as shown in FIG. 13, the phase input signal DIN2 transits to the high voltage level state from the high impedance state, and then transits to the low voltage level. Thus, the slave control circuit 102 changes to the master control circuit, and enters the initialization stage of the master control circuit. The phase output signal DOUT1 is at the high impedance state, and the switching circuit 112 is turn on by the switching control signal PWM2 when the pulse appears on the turn-on control signal Set.

Although switching circuits are all configured in synchronous BUCK in the foregoing embodiments, it can be understood by those skilled in the art that, the switching circuit can also adopt other topologies, such as asynchronous BUCK, BOOST, BUCK-BOOST, etc. The transistors contained therein could also use other suitable controllable semiconductor transistors, besides MOSFET. These transistors can be discrete devices, or integrated together with the corresponding control circuit and driver circuit. In some applications, inductors and capacitors in switching circuits can also be integrated. Moreover, the switch control circuit can adopt control methods other than the constant on time control. These modifications are easy to be understood by people of ordinary skills in the art, thus do not depart from the scope of the present invention.

Note that in the flow chart described above, the box functions may also be implemented with different order. For example, two successive box functions may be executed meanwhile, or sometimes the box functions may be executed in reverse order.

In some embodiments, a voltage level between a threshold voltage Vth1 (e.g. 2V) and a power supply voltage Vcc (e.g. 3.3V) is considered as logical high ("1"), a voltage level between zero voltage (0 V) and a threshold voltage Vth2 (e.g. 1V) is considered as logical low ("0"), and a voltage level between the threshold voltage Vth2 and Vth1 is considered as an intermediate level. The high impedance state refers to an output state of a circuit, which is neither logical high nor logical low. If this high impedance state is provided to a downstream circuit, its voltage level will be wholly determined by the downstream circuit, thus might be any of the logical high, logical low and intermediate levels. The high voltage level state refers to the output state which is logical high. The high voltage level state refers to the output state which is logical low.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A multiphase switching converter comprising:
a plurality of switching circuits coupled in parallel between an input voltage and an output voltage; and
a plurality of control circuits configured in a daisy chain, wherein each of the plurality of control circuits has a phase control input terminal and a phase control output terminal, and each of the plurality of control circuits is respectively coupled to one of the plurality of switching circuits to provide a switching control signal, wherein the phase control input terminal of each of the plurality of control circuits is coupled to the phase control output terminal of a previous one of the plurality of control circuits in the daisy chain to receive a phase input signal, and the phase control output terminal of each of the plurality of control circuits is coupled to the phase control input terminal of a latter one of the plurality of control circuits in the daisy chain to provide a phase output signal, and wherein one of the plurality of control circuits is configured as a master control circuit, and each of the rest of the plurality of control circuits is respectively configured as a slave control circuit; wherein when a current sense signal representative of a current flowing through a corresponding one of the plurality of switching circuits is less than a phase shedding threshold, and if a phase shedding condition is satisfied, then a corresponding one of the plurality of control circuits is configured to stop a power output of the corresponding one of the plurality of switching circuits, and the phase output signal of the corresponding one of the plurality of control circuits equals the phase input signal of the corresponding one of the plurality of control circuits; and wherein after the phase input signal exits a high impedance state, if a pulse appears on the phase input signal within a first preset time period, then the corresponding one of the plurality of control circuits is configured to resume the power output of the corresponding one of the plurality of switching circuits, and the phase output signal transits to the high impedance state.

2. The multiphase switching converter of claim 1, wherein the phase shedding condition comprises at least one of:
the corresponding one of the plurality of control circuits is a last one in the daisy chain; and
after providing the phase output signal transiting to a high voltage level state from the high impedance state, the pulse on the phase input signal lasts within a second preset time period.

3. The multiphase switching converter of claim 1, wherein when the phase input signal of the master control circuit transiting to a high voltage level state from the high impedance state, the master control circuit is configured to provide the switching control signal to turn on one of the plurality of switching circuits coupled to the master control circuit, the phase output signal changes to a low voltage level state, the phase output signal then changes to the high impedance state after a first blanking time period, and the phase output signal equals a turn-on control signal after a second blanking time period.

4. The multiphase switching converter of claim 1, wherein when the phase input signal of the master control circuit changes to a low voltage level state and lasts longer than a third preset time period, a control cycle of the daisy chain is finished, and the master control circuit is configured to provide the switching control signal based on a turn-on control signal, and provide the phase output signal at the high impedance state.

5. The multiphase switching converter of claim 4, wherein when the phase input signal of the master control circuit changes to the low voltage level state and lasts shorter than the third preset time period, the phase output signal of the master control circuit equals the turn-on control signal.

6. The multiphase switching converter of claim 1, wherein each of the plurality of control circuits comprises:
a phase shedding judging circuit, configured to receive the current sense signal and the phase shedding threshold, and configured to provide a phase shedding control signal via comparing the current sense signal with the phase shedding threshold;
a logic circuit, configured to receive the phase input signal and the phase shedding control signal, and configured to provide the switching control signal, a state control signal and a phase control signal based on the phase input signal and the phase shedding control signal; and
a driver, coupled to the logic circuit to receive the phase control signal and the state control signal, when the state control signal is at a first status, the driver is configured to provide the phase output signal at the high impedance state, and when the state control signal is at a second status, the driver is configured to provide the phase output signal based on the phase control signal.

7. The multiphase switching converter of claim 6, wherein when the current sense signal is less than the phase shedding threshold, and when the pulse appears on the phase input signal, the driver is configured to provide the phase output signal transiting to a high voltage level state from the high impedance state.

8. The multiphase switching converter of claim 1, wherein each of the plurality of control circuits further comprises:
a state machine, configured to control each of the plurality of control circuits operating at a start state, a master control circuit operating state, a slave control circuit operating state, and a bypass state; wherein
the start state comprises connecting each of the plurality of control circuits to a power supply, when be configured as the master control circuit, the master control circuit transits to the master control circuit operating state, and when be configured as the slave control circuit, the slave control circuit transits to the slave control circuit operating state;
the master control circuit operating state comprises providing the phase output signal and the switching control signal based on a turn-on control signal and the phase input signal;
the slave control circuit operating state comprises providing the phase output signal and the switching control signal based on the phase input signal, when the current sense signal is less than the phase shedding threshold, and when meets the phase shedding condition, the slave control circuit transits to the bypass state; and
the bypass state comprises providing the phase output signal equaling the phase input signal, and maintaining one of the plurality of switching circuits off via the switching control signal, and after the phase input signal exits the high impedance state, when the pulse appears on the phase input signal within the first preset time period, each of the plurality of control circuits transits to the slave control circuit operating state.

9. The multiphase switching converter of claim 8, wherein the master control circuit operating state comprises:
a first initialization state, configured to initialize the master control circuit to provide the phase output signal at the high impedance state, and provide the switching control signal based on the turn-on control signal;
a first phase transfer state, configured to provide the phase output signal equaling the turn-on control signal, when the phase input signal is at the low voltage level state, and lasts longer than a preset time period, then the master control circuit transits to the first initialization state, and when the phase input signal transits to the high voltage level state from the high impedance state, then the master control circuit transits to a first phase shedding operating state; and the first phase shedding operating state, configured to turn on one of the plurality of switching circuits via the switching control signal, and after a first blanking time period, the master control circuit transits to the first initialization state; wherein if the master control circuit is at the first initialization state, then the master control circuit transits to the first phase transfer state when the combination of the phase output signal and the switching control signal meets a phase transfer type.

10. The multiphase switching converter of claim 8, wherein the slave control circuit operating state comprises:

a second initialization state, configured to initialize the slave control circuit to provide the phase output signal at the high impedance state, and providing the switching control signal based on the phase input signal;

a second phase transfer state, configured to provide the phase output signal equaling the phase input signal, when the phase input signal is at the high impedance state, the slave control circuit transits to the second initialization state; and a second phase shedding state, configured to provide the phase output signal exiting the high impedance state, the slave control circuit transits to the bypass state if the phase shedding condition is satisfied, and the slave control circuit transits to the second initialization state if the phase shedding condition is not satisfied; wherein if the slave control circuit is at the second initialization state, then the slave control circuit transits to the second phase shedding operating state when the current sense signal is less than the phase shedding threshold.

11. A phase shedding control method for a multiphase switching converter, wherein the multiphase switching converter comprises a plurality of switching circuits coupled in parallel, and a plurality of control circuits configured in a daisy chain, each of the plurality of control circuits has a phase control input terminal and a phase control output terminal, and each of the plurality of control circuits is respectively coupled to one of the plurality of switching circuits to provide a switching control signal, and wherein the phase control input terminal of each of the plurality of control circuits is coupled to a previous one of the plurality of control circuits in the daisy chain to receive a phase input signal, and the phase control output terminal of each of the plurality of control circuits is coupled to a latter one of the plurality of control circuits in the daisy chain to provide a phase output signal, the phase shedding control method comprising:

sensing a current flowing through a corresponding one of the plurality of switching circuits, and providing a current sense signal accordingly;

comparing the current sense signal with a phase shedding threshold;

when the current sense signal is less than the phase shedding threshold, and when a phase shedding condition is satisfied, a corresponding one of the plurality of control circuits is configured to stop a power output of the corresponding one of the plurality of switching circuits, the phase output signal of the corresponding one of the plurality of control circuits equals the phase input signal of the corresponding one of the plurality of control circuits; and after the phase input signal exits a high impedance state, if a pulse appears on the phase input signal within a first preset time period, then the corresponding one of the plurality of control circuits is configured to resume the power output of the corresponding one of the plurality of switching circuits, and the phase output signal transits to the high impedance state.

12. The phase shedding control method of claim 11, wherein the phase shedding condition comprises at least one of:

the corresponding one of the plurality of control circuits is a last one in the daisy chain; and after providing the phase output signal transiting to a high voltage level state from the high impedance state, the pulse on the phase input signal lasts within a second preset time period.

13. The phase shedding control method of claim 11, further comprising:

when configured as a master control circuit, one of the plurality of control circuits enters a master control circuit operating state to provide the phase output signal and the switching control signal based on a turn-on control signal and the phase input signal;

when configured as a slave control circuit, one of the plurality of control circuits enters a slave control circuit operating state to provide the phase output signal and the switching control signal based on the phase input signal;

if one of the plurality of control circuits is in the slave control circuit operating state, when the current sense signal is less than the phase shedding threshold and when the phase shedding condition is satisfied, the slave control circuit transits to a bypass state; and if one of the plurality of control circuits is in the bypass state, then the phase output signal equals the phase input signal, and after the phase input signal exits the high impedance state, when the pulse appears on the phase input signal within the first preset time period, one of the plurality of control circuits transits to the slave control circuit operating state.

14. The phase shedding control method of claim 13, wherein the master control circuit operating state comprises:

a first initialization state, configured to initialize the master control circuit to provide the phase output signal at the high impedance state, and provide the switching control signal based on the turn-on control signal;

a first phase transfer state, configured to provide the phase output signal equaling the turn-on control signal, when the phase input signal is at the low voltage level state and lasts longer then a preset time period, the master control circuit transits to the first initialization state, and when the phase input signal transits to the high voltage level state from the high impedance state, the master control circuit transits to a first phase shedding operating state; and the first phase shedding operating state, configured to turn on the one of the plurality of switching circuits via the switching control signal, and after a first blanking time period, the master control circuit circuits transits to the first initialization state; wherein if the master control circuit is at the first initialization state, then the master control circuit transits to the first phase transfer state when the combination of the phase output signal and the switching control signal meets a phase transfer type.

15. The phase shedding control method of claim 13, wherein the slave control circuit operating state comprises:

a second initialization state, configured to initialize the slave control circuit to provide the phase output signal at the high impedance state, and providing the switching control signal based on the phase input signal;

a second phase transfer state, configured to provide the phase output signal equaling the phase input signal, when the phase input signal is at the high impedance state, the slave control circuit transits to the second initialization state; and a second phase shedding state, configured to provide the phase output signal exiting the high impedance state, the slave control circuit transits to the bypass state if the phase shedding condition is satisfied, and the slave control circuit transits to the second initialization state if the phase shedding condition is not satisfied; wherein if the slave control circuit is at the second initialization state, then the slave control circuit transits to the second phase shedding operating state when the current sense signal is less than the phase shedding threshold.

16. A control circuit used in a multiphase switching converter, wherein the multiphase switching converter comprises a plurality of switching circuits coupled in parallel and a plurality of control circuits configured in a daisy chain, and each of the plurality of control circuits is respectively coupled to one of the plurality of switching circuits to provide a switching control signal, the control circuit comprising:

a phase control input terminal configured to receive a phase input signal from a previous one of the plurality of control circuits in the daisy chain; and a phase control output terminal configured to provide a phase output signal to a latter one of the plurality of control circuits in the daisy chain; wherein when a current sense signal representative of a current flowing through a corresponding one of the plurality of switching circuits is less than a phase shedding threshold, and if the control circuit is a last one in the daisy chain or if a pulse on the phase input signal lasts within a first preset time period, then the control circuit is configured to stop a power output of the corresponding one of the plurality of switching circuits, and the phase output signal equals the phase input signal; where after the phase input signal exits a high impedance state, if a pulse appears on the phase input signal within a second preset time period, then the control circuit is configured to resume the power output of the corresponding one of the plurality of switching circuits, and the phase output signal transits to the high impedance state.

17. The control circuit of claim 16, further comprising:

a phase shedding judging circuit, configured to receive the current sense signal and the phase shedding threshold, and configured to provide a phase shedding control signal via comparing the current sense signal with the phase shedding threshold;

a logic circuit, configured to receive the phase input signal and the phase shedding control signal, and configured to provide the switching control signal, a state control signal and a phase control signal based on the phase input signal and the phase shedding control signal; and a driver, coupled to the logic circuit to receive the phase control signal and the state control signal, when the state control signal is at a first status, the driver is configured to provide the phase output signal at the high impedance state, and when the state control signal is at a second status, the driver is configured to provide the phase output signal based on the phase control signal.

18. The control circuit of claim 17, wherein when the current sense signal is less than the phase shedding threshold, and when the pulse appears on the phase input signal, the driver is configured to provide the phase output signal transiting to a high voltage level state from the high impedance state.

19. The control circuit of claim 16, further comprising:

a state machine, configured to control the control circuit operating at a start state, a master control circuit operating state, a slave control circuit operating state, and a bypass state; wherein the start state comprises connecting the control circuit to a power supply, when be configured as a master control circuit, the control circuit transits to the master control circuit operating state, and when be configured as a slave control circuit, the control circuit transits to the slave control circuit operating state;

the master control circuit operating state comprises providing the phase output signal and the switching control signal based on a turn-on control signal and the phase input signal;

the slave control circuit operating state comprises providing the phase output signal and the switching control signal based on the phase input signal, when the current sense signal is less than the phase shedding threshold, and when meets the phase shedding condition, the control circuit transits to the bypass state; and the bypass state comprises providing the phase output signal equaling the phase input signal, and maintaining the corresponding one of the plurality of switching circuits off via the switching control signal, and after the phase input signal exits the high impedance state, when the pulse appears on the phase input signal within the first preset time period, the control circuit transits to the slave control circuit operating state.

* * * * *